July 21, 1936. F. G. THWAITS Re. 20,039

RUNNING BOARD AND HOSE CARRIER

Original Filed Oct. 24, 1929 2 Sheets-Sheet 1

INVENTOR.

Frederick G. Thwaits

BY

Morsell, Keeney & Morsell

ATTORNEYS.

July 21, 1936. F. G. THWAITS Re. 20,039

RUNNING BOARD AND HOSE CARRIER

Original Filed Oct. 24, 1929 2 Sheets-Sheet 2

INVENTOR.

Frederick G. Thwaits

BY

Morsell, Keeney & Morsell

ATTORNEYS.

Reissued July 21, 1936

Re. 20,039

UNITED STATES PATENT OFFICE 20,039

RUNNING BOARD AND HOSE CARRIER

Frederick G. Thwaits, Wauwatosa, Wis., assignor to The Heil Co., Milwaukee, Wis., a corporation of Wisconsin Original No. 1,816,028, dated July 28, 1931, Serial No. 402,261, October 24, 1929. Application for reissue June 17, 1933, Serial No. 676,409

8 Claims. (Cl. 280—5)

This invention has relation to that class of motor tank trucks adapted to transport liquids, such as milk in bulk and oil and with respect to which it is important to provide means for housing the lengths of hose used for discharging the liquid from the tank and also for tools, utensils, etc., and the object of this invention is to provide a simply-constructed truck which will be strong and durable and which will provide the necessary housings for hose, etc., as more fully hereinafter set forth.

In the drawings annexed:

Figure 1:
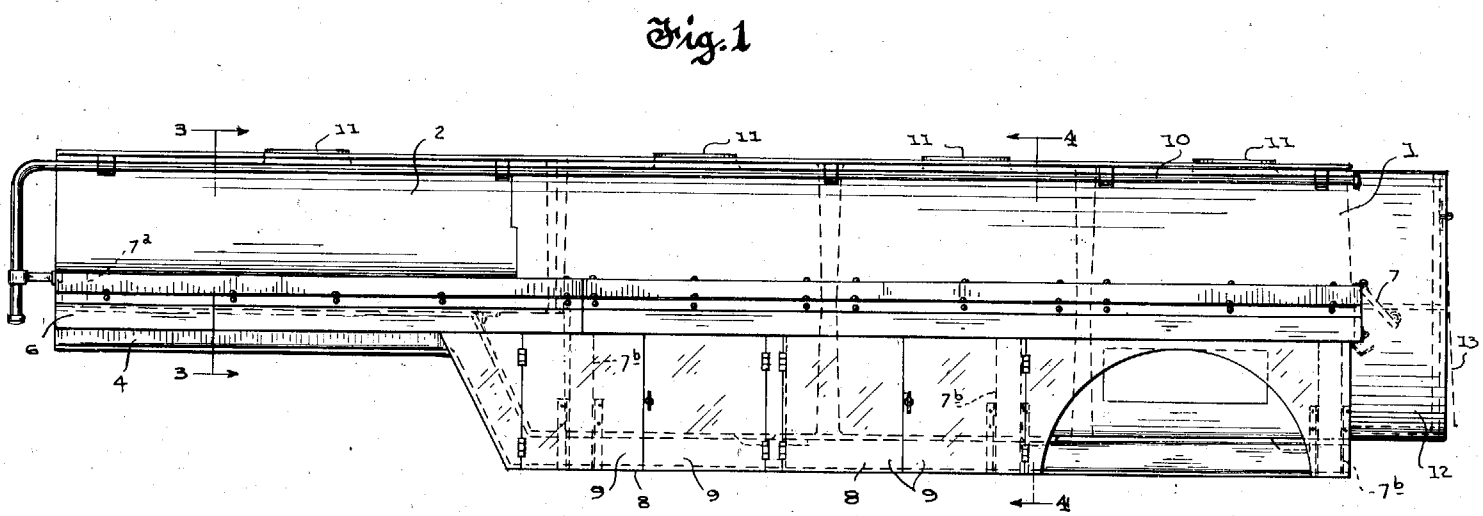
Fig. 1 is a side view of so much of a truck as it is necessary for me to illustrate in my invention.
Figure 2:
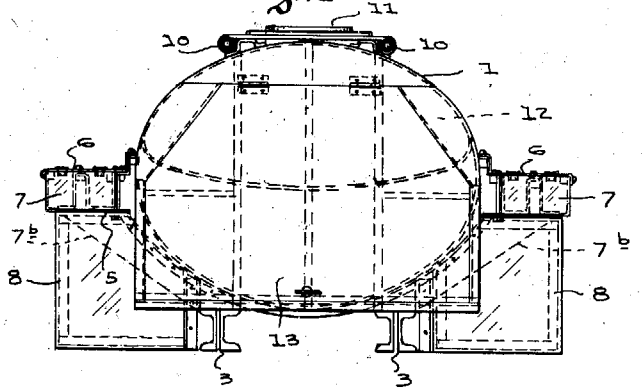
Fig. 2 is a view of the rear end of the truck structure, shown in Fig. 1.

Referring to the drawings by reference-numerals, 1 designates the rear portion of the tank and 2, the forward portion thereof, this forward portion being of less height than the rear portion, to thus permit the steering-wheels of the truck to work beneath this narrow forward portion of the tank. The tank is mounted upon channel truck-beams 3 which extend the length of the tank and are angled up as indicated by the numeral 4 at the forward end of the tank to support the shallower part of the tank.

Figure 3:
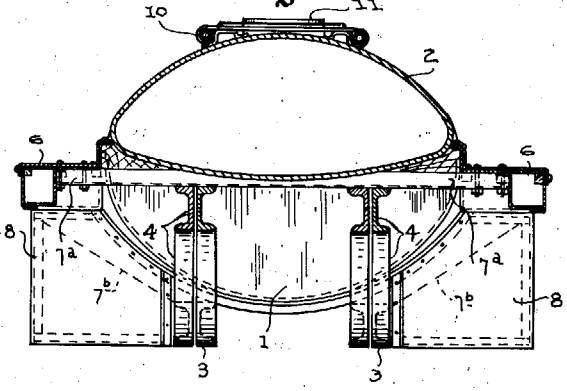
Fig. 3 is a vertical section on the line 3—3 of Fig. 1.
Figure 4:
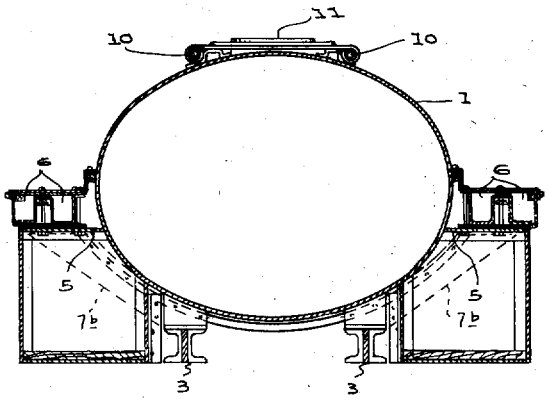
Fig. 4 is a vertical section on the line 4—4 of Fig. 1.
Figure 6:
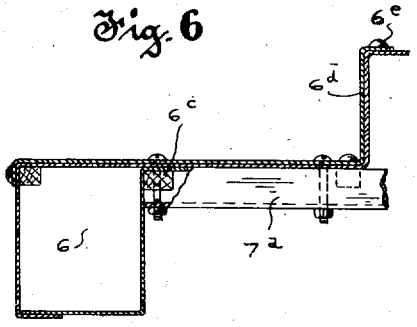
Fig. 6 is a similar section through the front single portion of the same upper side hose-compartment, the section being taken along the line 3—3 of Fig. 1.
Figure 5:
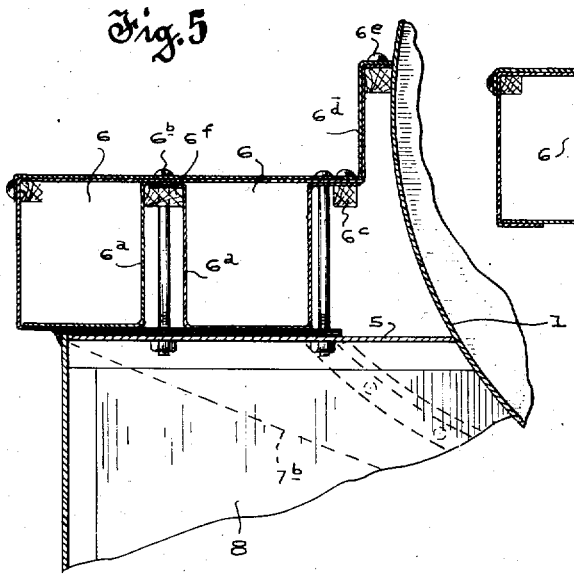
Fig. 5 is an enlarged transverse fragmentary section through the rear double portion of one of the upper side hose-compartments, the section being taken through the tank assemblage adjacent one of the lower side compartments.

At each side of the tank, upon the top-plate 5 of a sheet-metal compartment 8, is mounted a sheet-metal casing divided centrally by a double partition $6^a$ to form two longitudinal hose-compartments 6, this hose-casing being bolted down to the top of the plate 5 by means of a vertical bolt $6^b$. The inner hose-compartment 6 of each set, is of less length than the outer compartment, the former extending only up to the rear end of the shallower forward tank portion 2, and the latter extending up to the extreme front end of the portion 2. The top-plate of these hose-compartments is extended inwardly toward the tank and bolted to a longitudinal beam $6^c$, and thence the top-plate is bent upwardly to form a foot-guard $6^d$, the upper edge of the foot-guard being turned inwardly to meet the adjacent wall of the tank and being fastened to the longitudinal beam by means of a bolt $6^e$. Another longitudinal beam $6^f$ is fastened between the walls of the double partition $6^a$ by the aforesaid bolts $6^b$. Access to the hose-compartments 6 is had at the rear end of the truck by means of a door 7. These compartments are adapted to contain comparatively long lengths of hose and house them in convenient position for use from time to time as they are needed in discharging the milk or other liquid from the tank. At the forward, shallower part of the tank, the hose-compartment is reduced to a single compartment, as shown in Fig. 3, and the inwardly-extending foot-guard at that point is bolted down to cross-beams $7^a$.

The plate 5, above described, forms the top-plate of a series of sheet-metal compartments 8 arranged along each side of the tank and extending desirably the length of the tank between the wheels of the truck. These compartments form part of the structure of the hose-compartments, and are suspended therefrom, and the entire structure is supported on the cross beams $7^a$ and upon curved brackets $7^b$ which extend down to and from one to the other of the longitudinally extending truck beams 3, so as to afford a firm and substantial support for the running-boards provided by the hose-compartments. Each compartment is provided with a door 9. For the convenience of the attendants who make use of the running-board, I provide hand-rails 10 along the sides of the tank, and for filling the various compartments of the tanks, these compartments being formed by transverse partitions, as usual, I provide each compartment with a filling-opening 11. The rear end of the tank portion 1 forms a compartment 12 especially adapted for housing the utensils usually employed in connection with trucks of this character, and this compartment is closed by a door 13.

The outer side walls of the superimposed compartments 6, 8 form skirtings depending from the running-boards at the opposite sides of the tank body and spaced laterally from the lower portion thereof, and these skirtings extend from a point forwardly of the offset in the tank body indicated by double dotted, downwardly and rearwardly inclined lines in Fig. 1, to a point adjacent to the rear end of said body. The upper hose compartments 6, as well as the large lower compartments 8 are bounded at their outer sides by these skirtings, and the forward portions of the skirtings serve to hide or conceal the offset in the tank body, as clearly shown in Fig. 1. The upper sections of the skirtings formed by the outer walls of the compartments 6 directly adjacent to the running-boards, are of substantially uniform depth from end to end of the tank body; and the portions of these upper skirting sections which project forwardly beyond the offset, extend below the bottom of the reduced forward end portion 2 on both sides of the tank body.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use.

What is claimed as new is:

1. A vehicle transportable housing comprising, an elongated tank, an elongated compartment secured to and forming a running board extending along each of the opposite sides of said tank, said elongated compartments being accessible only from the rear of said tank, and other compartments suspended from said elongated compartments and extending downwardly into the space between the front and rear wheels of the vehicle, said other compartments being accessible only from the sides of said tank.

2. A vehicle transportable housing comprising, an elongated tank having elliptical cross-section with its major diameter horizontal, an elongated compartment secured to the medial portion of each of the opposite sides of said tank and extending therealong to form running boards, said elongated compartments being accessible only from the rear of said tank, and other compartments suspended from said elongated compartments and extending under said tank and downwardly into the space between the front and rear wheels of the vehicle, said other compartments being accessible only from the sides of said tank.

3. In a tank vehicle, a tank body having a reduced end portion providing an offset in the under side of said tank body, a housing on said vehicle forming an upper compartment extending rearwardly from the front of said body and having a substantially straight top portion extending laterally from said tank body, a vertical wall extending downwardly from said top wall in spaced relation to said tank body from a point forward of said offset in said tank body to a point adjacent the rear end of said tank body, and a lower compartment beneath said upper compartment extending rearwardly from said offset.

4. In a tank truck structure, a tank body, a skirting depending from each side of said body in spaced relation to the lower portion thereof, a running board extending from each side of said body to the adjacent skirting, and a plurality of superimposed compartments within each of said skirtings under the adjacent running board.

5. In a tank truck structure, a tank body havhaving a reduced end portion providing a medial offset in the tank bottom, a skirting depending from each side of said body in spaced relation to the lower portion thereof and extending past said offset, a running board extending from each side of said body to the top of the adjacent skirting, and a plurality of superimposed compartments within each of said skirtings under the adjacent running board.

6. In a tank vehicle, an elongated tank having a reduced front portion, an elongated compartment secured to and forming a running board extending along each of the opposite sides of said tank and substantially throughout the length thereof, and other compartments of lesser length disposed beneath said elongated compartments and extending rearwardly away from said reduced tank portion.

7. In a tank vehicle, an elongated tank having a medial offset, an elongated compartment secured to and forming a running board extending along each of the opposite sides of said tank and past said offset, and other compartments disposed beneath said elongated compartments and extending rearwardly away from said offset.

8. In a tank vehicle, an elongated tank having a reduced front portion forming a medial offset, an elongated compartment forming a running board extending along each of the opposite sides of said tank and past said offset, doors for effecting access to said compartments only from the ends, other compartments disposed beneath said elongated compartments and extending rearwardly away from said offset, and other doors for effecting access to said other compartments from the sides of the tank.

FREDERICK G. THWAITS.